United States Patent [19]

Oakley

[11] Patent Number: 5,318,462
[45] Date of Patent: Jun. 7, 1994

[54] COMPACT RAIL MOUNTABLE FUSE HOLDER

[75] Inventor: George H. Oakley, Burnet, Tex.

[73] Assignee: Gould Inc., Eastlake, Ohio

[21] Appl. No.: 990,790

[22] Filed: Dec. 10, 1992

[51] Int. Cl.$^5$ .............................................. H01R 9/26
[52] U.S. Cl. .................................... 439/716; 439/621
[58] Field of Search ............ 439/532, 716, 717, 621; 248/214, 221.4, 231.4, 316.4

[56] References Cited

U.S. PATENT DOCUMENTS

| | | |
|---|---|---|
| 3,992,074 | 11/1976 | Rymer . |
| 3,993,395 | 11/1976 | Taylor . |
| 4,018,502 | 4/1977 | Glaesel . |
| 4,268,108 | 5/1981 | Debaigt . |
| 4,707,563 | 11/1987 | Conrad et al. . |
| 4,767,339 | 8/1988 | Comerci . |
| 4,878,859 | 11/1989 | Haller et al. . |
| 4,900,275 | 2/1990 | Fasano ........................... 439/716 |
| 4,921,445 | 5/1990 | Herbert ......................... 439/716 X |
| 4,926,149 | 5/1990 | Saens et al. . |
| 4,947,290 | 8/1990 | Ootsuka . |
| 5,000,692 | 3/1991 | Taniguchi et al. ............. 439/716 X |

FOREIGN PATENT DOCUMENTS 2845670  10/1978  Fed. Rep. of Germany .

Primary Examiner—Larry I. Schwartz
Assistant Examiner—Khiem Nguyen
Attorney, Agent, or Firm—Fish & Richardson

[57] ABSTRACT

A fuse holder including an insulative housing with integral recesses for receiving portions of a rail and a sliding locking member that slides on the housing between a locked position in which the fuse holder is retained on the rail and a mounting position in which the fuse holder can be mounted on or removed from the rail, the sliding locking member being biased toward the locked position via a resilient cantilevered tab of the sliding locking member and maintainable in the mounting position via snap in engagement with a notch on the housing, the sliding locking member having side walls with bent taps which form lips resting on a recessed shelf surface of the housing.

31 Claims, 2 Drawing Sheets

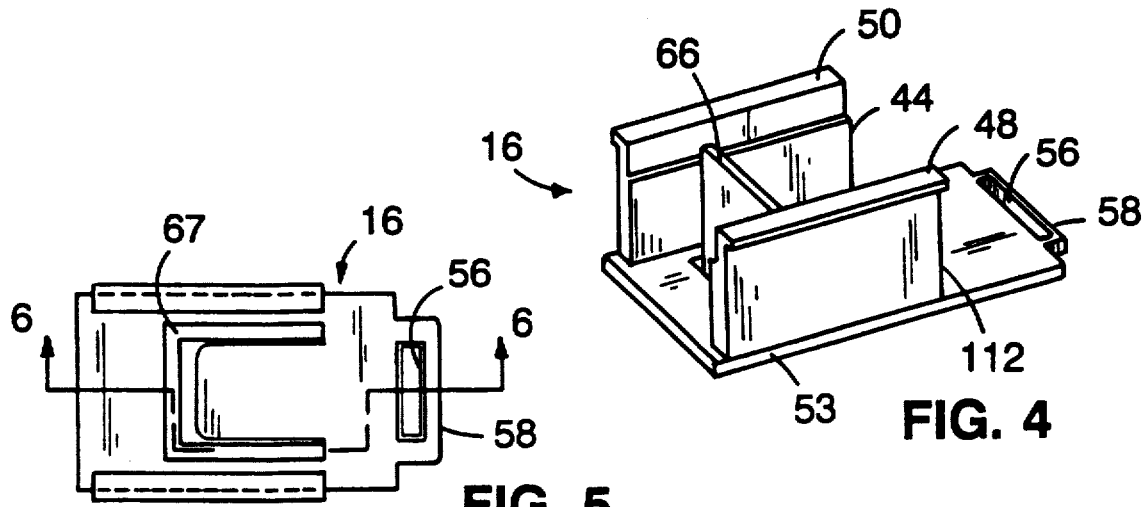
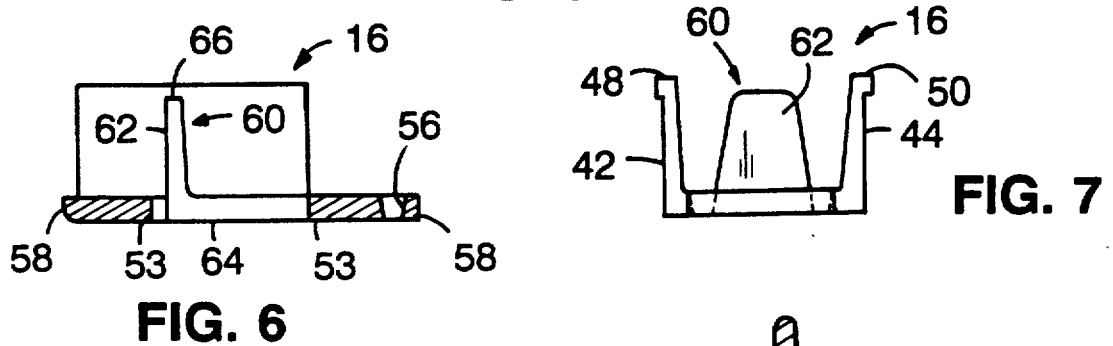
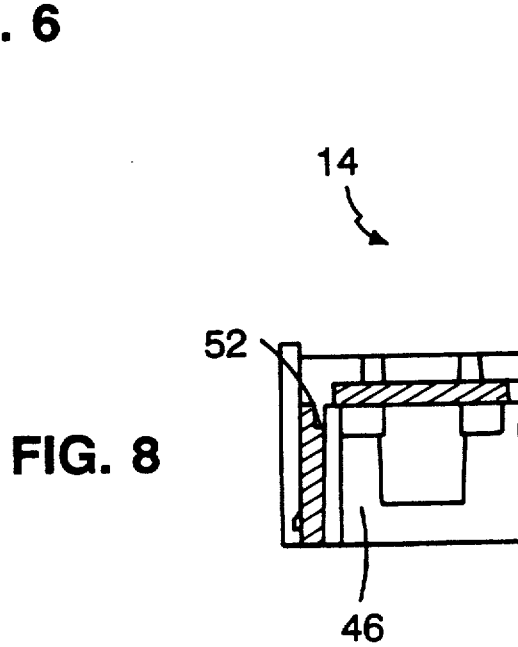

COMPACT RAIL MOUNTABLE FUSE HOLDER

BACKGROUND OF THE INVENTION

The invention relates to fuse holders and other electronic assemblies that include built-in mechanisms for attaching to rails.

So-called DIN rails are used for mounting fuse holders and other electronic assemblies that engage the edges of the rails Fuse holders, which are normally surface mounted, have been mounted on DIN rails via adapters that are connected to the fuse holders and in turn have mechanisms to engage the edges of the rails, e.g., as shown in U.S. Pat. Nos. 4,767,339 and 4,921,445. Some fuse holders have included integral lips for engaging rails (e.g., FIGS. 4-6 of U.S. Pat. No. 4,767,339), and other types of electronic devices have included built-in mechanisms for mounting on rails, e.g., U.S. Pat. Nos. 4,947,290; 4,926,149; 5,000,692; 4,268,108; 4,878,859; 4,018,413; and 4,900,275.

SUMMARY OF THE INVENTION

In one aspect, the invention features, in general, a fuse holder including an insulative housing having integral recesses which receive receiving portions of a rail and a sliding locking member that slides on the housing between a locked position in which the fuse holder is retained on the rail and a mounting position in which the fuse holder can be mounted on or removed from the rail. Contacts for electrically engaging a fuse are carried by the housing.

In preferred embodiments, the sliding locking member has a tool receiving slot used to move the sliding locking member from the locked to the mounting position.

In another aspect, the invention features, in general, a rail mounting assembly including a housing having integral recesses which receive portions of a rail and a sliding locking member that slides on the housing. The locking member is biased toward a locked position via a resilient, cantilevered tab of the locking member and is maintainable in a mounting position via snap-in engagement of an end of the tab with a notch on the housing.

In preferred embodiments, the cantilevered tab has an end portion that is generally perpendicular to a sliding axis and slides on an inclined surface of the housing. The tab also has a base portion that is generally parallel to the sliding axis and is flexibly movable in an opening in a bottom wall of the sliding locking member.

In another aspect, the invention features, in general, a rail mounting assembly including a housing having integral recesses which receive portions of a rail and a sliding locking member that slides on the housing between a locked position and a mounting position. The sliding locking member is made of a one-piece molded part that has two side walls that sit in a cavity space in the housing and have bent tops which form lips resting on recessed shelf surfaces of the housing.

In preferred embodiments, the upper surfaces of the side walls have curved outer surfaces, permitting resilient inward deflection of the side walls during assembly and outward movement of the lips after they have been moved beyond the recessed shelf surfaces.

Other features and advantages of the invention will be apparent from the following description of a preferred embodiment thereof and from the claims.

DESCRIPTION OF THE PREFERRED EMBODIMENT

The drawings will be described first.

FIG. 4 is a perspective view of the sliding locking member of the FIG. 1 fuse holder.

FIG. 5 is a plan view of the FIG. 4 sliding locking member.

FIG. 6 is a vertical sectional view, taken at 6—6 of FIG. 4, of the FIG. 4 sliding locking member.

FIG. 7 is a side elevation of the FIG. 4 sliding locking member.

FIG. 8 is a vertical sectional view, taken at 8—8 of FIG. 2, of the housing of the FIG. 1, fuse holder.

STRUCTURE, MANUFACTURE AND USE

Figure 1:
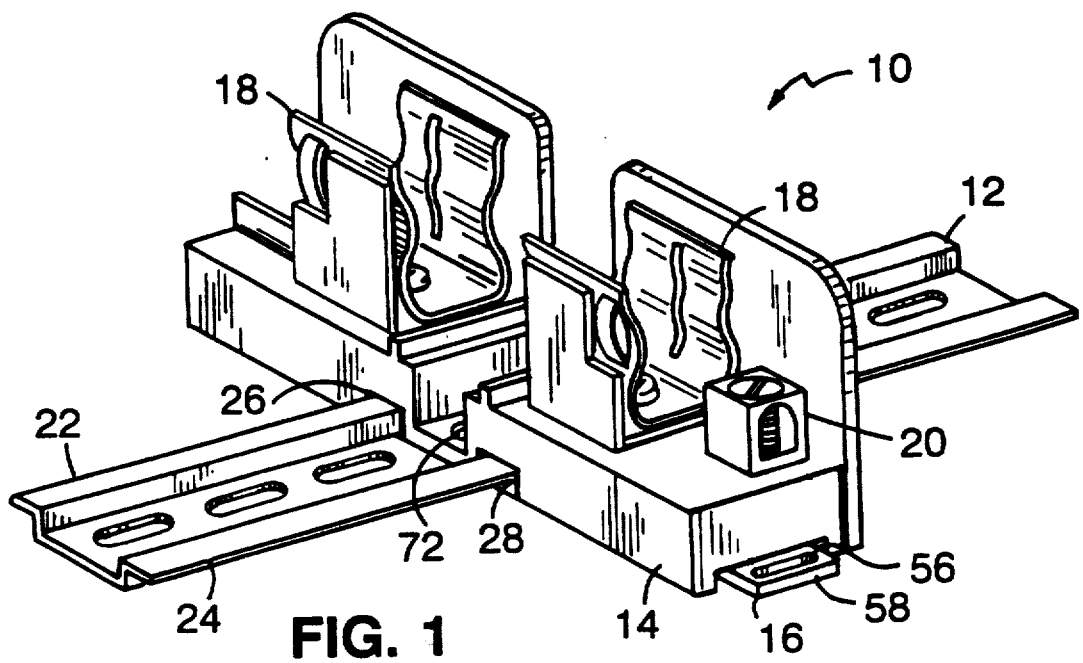
FIG. 1 is a perspective view of a fuse holder according to the invention shown mounted on a rail.
Figure 2:
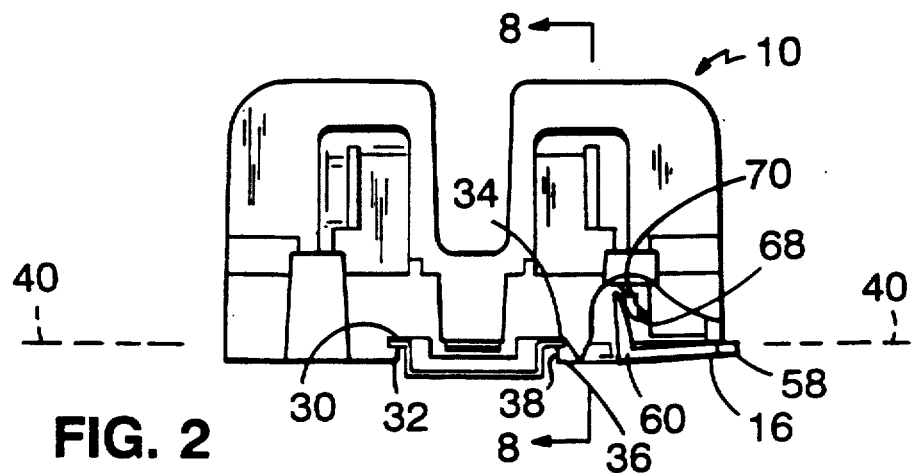
FIGS. 2 and 3 are side views, partially broken away, of the FIG. 1 fuse holder shown with its sliding locking member in a locked position and a mounting position, respectively.
Figure 3:
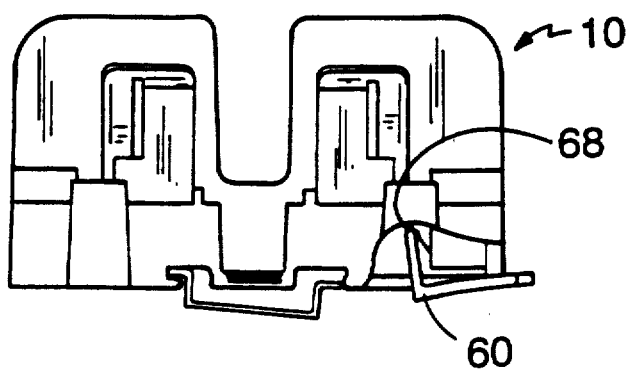

Referring to FIGS. 1 and 2, fuse holder 10 is shown mounted on DIN rail 12. Fuse holder 10 includes housing 14, sliding locking member 16, electrical contacts 18 (for engaging and making electrical contact with a fuse), and terminals 20 (for connecting to electrical wires). Edge portions 22, 24 of rail 12 (also referred to as "receiving portions") sit within integral recesses 26, 28 of housing 14. Edge portion 22 is engaged by facing upper and lower surfaces 30 and 32 at recess 26. Edge 24 is engaged by upper surface 34 at recess 28 and facing surface 36 of detent 38 of sliding locking member 16 when it is in the locked position shown in FIG. 2.

Referring to FIGS. 2-8, sliding locking member 16 (shown alone in FIG. 4) is slidably mounted on housing 14 along sliding axis 40 between a locked position (FIG. 2), in which fuse holder 10 is retained on rail 12, and a mounting position (FIG. 3), in which fuse holder 10 can be mounted on or removed from rail 12. Sliding locking member 22 has two side walls 42, 44 (FIGS. 4, 7) which travel in cavity 46 (FIG. 8) within housing 14. Side walls 42, 44 have bent tops which form lips 48, 50 that sit on recessed shelf surfaces 52, 54 of housing 14 (FIG. 8). The lower surfaces of lips 48, 50 are located 0.491" above the lower surface of bottom wall 53, the same distance that the shelf surfaces 52, 54 are above the bottom surface of housing 14. The upper surfaces of side walls 42, 44 have curved outer edges. Sliding locking member 16 has tool-receiving slot 56 in slotted end 58 that extends beyond housing 14.

Cantilevered tab 60 is located between detent 38 and slotted end 58 and has end portion 62, generally perpendicular to sliding axis 40, and perpendicular base portion 64, generally parallel with sliding axis 40 and connected at one end to bottom wall 53, which has open area 67 in which base portion 64 is flexibly movable. End 66 of end portion 62 slides along inclined surface 68 of housing 14. Surface 68 is oriented at an acute angle (preferably between 30° and 60°, and most preferably about 45°) with sliding axis 40 and has notch 70, which is engaged by end 66 of tab 60 by snap-in engagement. Notch 70 is defined by two surfaces, one that is parallel with axis 40 and is shorter in distance than the thickness of end 66, and one that is oriented at an angle of 80° with axis 40. The first mentioned surface is located 0.448" above the lower surface of housing 14, while end 66 is located 0.512" above the lower surface of bottom wall 53. This difference in height causes a generally vertically directed force by end 66 against the upper surface of notch 70, causing sliding locking member 16 to be maintained in the mounting position when end 66 is in notch 70. This difference in height also causes a vertically directed force by end 66 against inclined surface 68, biasing sliding locking member 16 toward the locked position when end 66 has been moved out of notch 70.

Housing 14 also has central elongated slot 72 (one end of which is shown in FIG. 1) to permit attaching fuse holder 10 to a supporting substrate via screws or bolts. The flat nature of the bottom of housing 14 and the flush mounting of sliding locking member 16 facilitate such mounting.

Housing 14 and sliding locking member 16 are each made of a one-piece molded plastic part. In assembling fuse holder 10, sidewalls 42, 44 are inserted into cavity 46. The curved nature of the outer edges of the tops of side walls 42, 44 causes them to be resiliently deflected inward by the inner surfaces defining the sides of cavity 46. When lips 48, 50 are above recessed shelf surfaces 52, 54, they expand outward over surfaces 52, 54, locking sliding locking member in place. All that is required to complete assembly is to secure contacts 18 and terminals 20 on housing 14 via screws. Thus only a single additional plastic part is used to provide the fuse holder with a resilient locking member for mounting on a DIN rail, and the part is added to the fuse holder via a simple snap-in procedure.

In use, sliding locking member is moved to the mounting position (FIG. 3) by pulling slotted end 58 away from housing 14, either by engaging with fingers or with a screw driver in slot 56. Fuse holder 10 is maintained in the mounting position via snap-in engagement of end 66 of tab 60 with notch 70. Fuse holder 10 is then placed in position over rail 12, and slotted end 58 is pushed, moving end 66 beyond notch 70. The resulting interaction of upwardly-biased end 66 of tab 60 with inclined surface 68 results in biasing member 16 toward and into the locked position (FIG. 2).

Other embodiments of the invention are within the scope of the following claims.

What is claimed is:

1. A fuse holder that is mountable on a rail having receiving portions comprising:
   a housing made of insulative material, said housing including integral recesses which receive said receiving portions of said rail, said housing having a surface that is inclined at an acute angle with a sliding axis and has a notch at an intermediate position along the length thereof,
   contacts mounted on said housing for electrically engaging a fuse, and
   a sliding locking member that is slidably mounted on said housing along said sliding axis between a locked position in which said fuse holder is retained on said rail and a mounting position in which said fuse holder can be mounted on or removed from said rail, said locking member having a resilient, cantilevered tab that has an end that slides along said inclined surface as said locking member moves between said mounting position and said locked position, said cantilevered tab being resiliently deflected and biasing said locking member toward said locked position with a force along said sliding axis that increases as said locking member moves further away from said locked position, said locking member being maintained in said mounting position via snap-in engagement of said end of said tab with said notch on said housing, said end of said tab being maintained in said notch via a force against said notch.

2. The fuse holder of claim 1 wherein said locking member is biased toward said locked position via a resilient, cantilevered tab of said locking member and is maintainable in said mounting position via snap-in engagement of an end of said tab with a notch on said housing.

3. The fuse holder of claim 2 wherein said sliding locking member comprises a one-piece molded plastic part.

4. The fuse holder of claim 1 wherein said sliding locking member has a detent that is movable between interfering and non-interfering positions with a said rail receiving portion.

5. The fuse holder of claim 2 wherein said tab has an end portion that is oriented generally perpendicular to said sliding axis, and said housing has a surface that is inclined at an acute angle with said sliding axis, said end sliding along said inclined surface as said locking member moves from said mounting position toward said locked position.

6. The fuse holder of claim 5 wherein said tab has a base portion that is connected at one end of said base portion to said end portion near said axis and is generally parallel to said axis, said base portion being connected at the other end of said base portion to a bottom wall of said locking member, said bottom wall having an open area in which said base portion is flexibly movable.

7. The fuse holder of claim 6 wherein said sliding locking member has a tool-receiving slot in a portion that extends beyond said housing and can be used to move said sliding locking member from said locked position to said mounting position, and wherein said sliding locking member is movable out of said mounting position by pushing said slotted end toward said housing, resulting in biasing of said locking member into said locked position owing to interaction of said end with said inclined surface.

8. The fuse holder of claim 3 wherein said slot is spaced further from said housing when said sliding locking member is in said mounting position than it is when said sliding locking member is in said locked position.

9. The fuse holder of claim 1 wherein said housing has a slot in a bottom wall thereof for mounting of said housing on a mounting surface.

10. The fuse holder of claim 3 wherein said sliding locking member has two side walls located in a cavity space in said housing, said cavity space permitting sliding movement of said side walls parallel to said sliding axis, said side walls having bent tops which form lips, and wherein said housing has recessed shelf surfaces, and said lips rest on said recessed shelf surface of said housing.

11. The fuse holder of claim 3 wherein said sliding locking member has two side walls located in a cavity space in said housing, said cavity space permitting sliding movement of said side walls parallel to said sliding axis, said side walls having bent tops which form lips, and wherein said housing has recessed shelf surfaces, and said lips rest on said recessed shelf surface of said housing.

12. A rail mounting assembly comprising:

a housing, said housing including integral recesses which receive receiving portions of a rial, said housing having a surface that is inclined at an acute angle with a sliding axis and has a notch at an intermediate position along the length thereof, and a sliding locking member that is slidably mounted on said housing along said sliding axis between a locked position in which said assembly is retained on said rail and a mounting position in which said assembly can be mounted on or removed from said rail, said locking member being biased toward said locked position via a resilient, cantilevered tab of said locking member and maintainable in said mounting position via snap-in engagement of an end of said tab with said notch on said housing, said end sliding along said inclined surface as said locking member moves between said mounting position and said locked position, said cantilevered tab being resiliently deflected and biasing said locking member toward said locked position with a force along said sliding axis that increases as said locking member moves further away from said locked position, said locking member being maintained in said mounting position via snap-in engagement of said end of said tab with said notch on said housing, said end of said tab being maintained in said notch via a force against said notch.

13. The rail mounting assembly of claim 12 wherein said sliding locking member has a tool-receiving slot in a portion that extends beyond said housing and can be used to move said sliding locking member from said locked position to said mounting position.

14. The rail mounting assembly of claim 13 wherein said slot is spaced further from said housing when said sliding locking member is in said mounting position than it is when said sliding locking member is in said locked position.

15. The rail mounting assembly of claim 12 wherein said sliding locking member comprises a one-piece molded plastic part.

16. The rail mounting assembly of claim 12 wherein said sliding locking member has a detent that is movable between interfering and non-interfering positions with a said rail receiving portion.

17. The rail mounting assembly of claim 15 wherein said sliding locking member has a detent that is movable between interfering and non-interfering positions with a said rail receiving portion.

18. The rail mounting assembly of claim 15 wherein said tab has an end portion that is oriented generally perpendicular to said sliding axis, and said housing has a surface that is inclined at an acute angle with said sliding axis, said end sliding along said inclined surface as said locking member moves from said mounting position toward said locked position.

19. The rail mounting assembly of claim 18 wherein said tab has a base portion that is connected at one end of said base portion to said end portion near said axis and is generally parallel to said axis, said base portion being connected at the other end of said base portion to a bottom wall of said locking member, said bottom wall having an open area in which said base portion is flexibly movable.

20. The rail mounting assembly of claim 15 wherein said tab has an end portion that is oriented generally perpendicular to said sliding axis, and said tab has a base portion that is connected at one end of said base portion to said end portion near said axis and is generally parallel to said axis, said base portion being connected at the other end of said base portion to a bottom wall of said locking member, said bottom wall having an open area in which said base portion is flexibly movable.

21. The rail mounting assembly of claim 15 wherein said sliding locking member has two side walls located in a cavity space in said housing, said cavity space permitting sliding movement of said side walls parallel to said sliding axis, said side walls having bent tops which form lips, said lips resting on recessed shelf surfaces of said housing.

22. The rail mounting assembly of claim 19 wherein said sliding locking member is movable out of said mounting position by pushing said slotted end toward said housing, resulting in biasing of said locking member into said locked position owing to interaction of said end with said inclined surface.

23. The rail mounting assembly of claim 12 wherein said housing has a slot for attachment to a mounting surface.

24. The rail mounting assembly of claim 12 wherein said recesses are positioned to engage a DIN rail.

25. The rail mounting assembly of claim 12 wherein said housing carries electrical components of a terminal block.

26. The rail mounting assembly of claim 12 wherein said housing carries electrical components of a relay.

27. A rail mounting assembly comprising:

a housing, said housing including integral recesses which receive contacts for electrically engaging a fuse mounted on said housing, said housing having a cavity space and recessed shelf surfaces extending outwardly therefrom at an interior portion thereof, and a sliding locking member that is slidably mounted on said housing along a sliding axis between a locked position in which said assembly is retained on said rail and a mounting position in which said assembly can be mounted on or removed from said rail, said sliding locking member comprising a one-piece molded plastic part, said sliding locking member having a bottom wall and two side walls extending upwardly from said bottom wall, said side walls being located in said cavity space in said housing, said cavity space permitting sliding movement of said side walls parallel to said sliding axis, said side walls having bent tops which form lips, said lops resting on said recessed shelf surface of said housing, said side walls being resilient so as to permit said lips to be resiliently, inwardly deflected during assembly of said sliding locking member on said housing via movement along an assembly axis transverse to said sliding axis and to move outward over said shelf surfaces after being moved along said assembly axis beyond said shelf surfaces.

28. The rail mounting assembly of claim 27 wherein said side walls have upper surface with curved outer edges.

29. The rail mounting assembly of claim 27 wherein said locking member is biased toward said locked position via a resilient, cantilevered tab of said locking member and is maintainable in said mounting position via snap-in engagement of an end of said tab with a notch on said housing.

30. The rail mounting assembly of claim 29 wherein said sliding locking member has a detent that is movable between interfering and non-interfering positions with a said rail receiving portion.

31. The rail mounting assembly of claim 30 wherein said tab has an end portion that is oriented generally perpendicular to said sliding axis, and has a base portion that is connected at one end of said base portion to said end portion near said axis and is generally parallel to said axis, said base portion being connected at the other end of said base portion to a bottom wall of said locking member, said bottom wall having an open area in which said base portion is flexibly movable.

* * * * *

UNITED STATES PATENT AND TRADEMARK OFFICE
CERTIFICATE OF CORRECTION

PATENT NO. : 5,318,462
DATED : June 7, 1994
INVENTOR(S) : George H. Oakley

It is certified that error appears in the above-indentified patent and that said Letters Patent is hereby corrected as shown below:

Col. 4, claim 11, line 1, change "3" to --6--.

Col. 1, line 11, after "rails" insert a period.

Signed and Sealed this

Thirtieth Day of July, 1996

Attest:

BRUCE LEHMAN

*Attesting Officer*     *Commissioner of Patents and Trademarks*